(12) United States Patent
Møller

(10) Patent No.: US 9,657,770 B2
(45) Date of Patent: May 23, 2017

(54) ARTICULATED JOINT AND A DEVICE FOR SUPPORTING A PERSON

(71) Applicant: R82 A/S, Gedved (DK)

(72) Inventor: Flemming Møller, Horsens (DK)

(73) Assignee: R82 A/S, Gedved (DK)

( * ) Notice: Subject to any disclaimer, the term of this patent is extended or adjusted under 35 U.S.C. 154(b) by 214 days.

(21) Appl. No.: 14/365,175

(22) PCT Filed: Dec. 13, 2012

(86) PCT No.: PCT/DK2012/050463
§ 371 (c)(1),
(2) Date: Jun. 13, 2014

(87) PCT Pub. No.: WO2013/087079
PCT Pub. Date: Jun. 20, 2013

(65) Prior Publication Data
US 2014/0332044 A1    Nov. 13, 2014

(30) Foreign Application Priority Data

Dec. 15, 2011  (DK) ................................ 2011 70713
Sep. 12, 2012  (DK) ................................ 2012 70559

(51) Int. Cl.
*F16C 11/10*   (2006.01)
*A61H 3/04*    (2006.01)
*E05D 11/10*   (2006.01)

(52) U.S. Cl.
CPC .............. *F16C 11/103* (2013.01); *A61H 3/04* (2013.01); *E05D 11/10* (2013.01); *A61H 2201/0161* (2013.01); *Y10T 403/32426* (2015.01)

(58) Field of Classification Search
CPC ... A61H 3/04; A61H 2201/0161; F16C 11/10; F16C 11/103; Y10T 403/32262;
(Continued)

(56) References Cited

U.S. PATENT DOCUMENTS 2,890,060 A    6/1959  Smith
3,048,883 A *  8/1962  Rizzuto ............... E05D 11/1007
                                                  16/353

(Continued)

FOREIGN PATENT DOCUMENTS

GB           2478705           9/2011
JP     WO 2008139851 A1 *  11/2008 ........... B60N 2/2252

*Primary Examiner* — Jonathan Masinick
(74) *Attorney, Agent, or Firm* — James Creighton Wray; Meera P. Narasimhan

(57) ABSTRACT

An articulated joint pivotably connects first leg and second legs. A first joint member attaches to the first leg. A second joint member attaches to the second leg. The joint members have facing abutment surfaces. Each joint member has a shaft opening receives a shaft for connecting the joint members, such that the legs may pivot between an open and a closed position. A clamping means releasably presses abutment surfaces of the joint members toward each other. A locking means releasably positively secures the joint members in at least the open position. Each joint member has a first aperture. The first aperture is radially offset from the shaft opening. The first apertures of each joint member are coaxially arranged in at least the open position. A device for supporting a person is included.

11 Claims, 8 Drawing Sheets

(58) Field of Classification Search
CPC ..... Y10T 403/32418; Y10T 403/32426; Y10T 403/32442
See application file for complete search history.

(56) References Cited

U.S. PATENT DOCUMENTS

| | | | |
|---|---|---|---|
| 3,840,034 A | | 10/1974 | Smith |
| 4,614,452 A | * | 9/1986 | Wang .................. F16B 7/04 403/146 |
| 5,353,892 A | * | 10/1994 | Lu ....................... E06C 1/32 16/328 |
| 5,620,272 A | * | 4/1997 | Sheng ............... E05D 11/1007 182/163 |
| 6,343,406 B1 | * | 2/2002 | Yeh ................... E05D 11/1007 16/328 |
| 6,361,106 B1 | | 3/2002 | Huang |
| 2002/0063457 A1 | | 5/2002 | Hsia |
| 2003/0037412 A1 | | 2/2003 | Lee |
| 2004/0216277 A1 | * | 11/2004 | Beaver ................ E06C 1/32 16/324 |
| 2005/0252721 A1 | * | 11/2005 | Parker ................. A47C 12/00 182/165 |
| 2009/0194974 A1 | | 8/2009 | Smith |

* cited by examiner

ARTICULATED JOINT AND A DEVICE FOR SUPPORTING A PERSON

This application claims the benefit of Danish Application No. PA 2011 70713 filed Dec. 15, 2011, Danish Application No. PA 2012 70559 filed Sep. 12, 2012 and PCT/DK2012/050463 filed Dec. 13, 2012, International Publication No. WO 2013/087079, which are hereby incorporated by reference in their entirety as if fully set forth herein.

FIELD OF THE INVENTION

The present invention relates to an articulated joint, for pivotably connecting a first leg to a second leg and a device for supporting a person.

BACKGROUND OF THE INVENTION

In connection with aids for disabled there are a number of requirements that must be met by such equipment.

The most important requirement is that of safety. The equipment must be safe for the user as well as the helper. The equipment should be fail-safe such that unintentional use does not result in injuries.

Another important requirement is that of transportability. It should be possible to transport the equipment by car, as a car is considered the most common and restrictive means of transportation from location to location. Redundancy by having to duplicate the equipment at different locations is hereby avoided. The daily travel of a disabled child between different locations may for example include to/from home from/to school.

WO 94/20058 discloses a walking aid. The walking aid comprises two leg frames. The leg frames are connected by an articulated joint, such that the leg frames may rotate in relation to each other between an opened position and a collapsed position. The walking aid thereby becomes collapsible, such that it may be transported in its collapsed state using a minimum of storage space. The articulated joint is prevented from unintentional rotation in its open condition, such that the user may use the walking aid in a safe manner. The means for preventing rotation of the articulated joint comprise a first means restricting the rotation of the connection members beyond the fully open position and a second means that may be selectively inserted, and which is restricting the rotation of the connection members in the open position towards the collapsed position.

US 2002/063457 A1 disclose an adjustable frame of a rocker. The frame comprises an articulated joint. The joint has two joint members with interacting protrusions/depressions such that they can engage and positively lock the articulated joint in a number of positions when the two joint members are pressed against each other.

OBJECT OF THE INVENTION

An object of the present invention is to provide an articulated joint for a walking aid, that is an alternative to the prior art.

DESCRIPTION OF THE INVENTION

According to the present invention, this is achieved by an articulated joint, for pivotably connecting a first leg to a second leg, the joint comprising;
 a first joint member, configured for attachment to the first leg,
 a second joint member, configured for attachment to the second leg,
 a shaft, wherein the joint members have facing abutment surfaces, wherein the joint members each has a shaft opening, wherein the shaft is received through the shaft openings, for connecting the joint members, such that the legs may pivot between an open and a closed position,
 a clamping means, for releasably pressing the abutment surfaces of the joint members toward each other, and
 a locking means, for releasable positive securing of the joint members in at least the open position, wherein each joint member has a first aperture, wherein the first aperture is radially offset from the shaft opening, wherein the first aperture of each joint member are coaxially arranged in at least the open position.

Furthermore this is achieved by a device, for supporting a person, the device comprising two articulated joints according to the invention, a first leg frame having two first legs and a second leg frame having two second legs, wherein said two articulated joints is connected between the first and second leg frames, for pivoting of the leg frames between an open and a closed position.

It is herewith achieved that and alternative solution of an articulated joint is provided. The articulated joint is completely self contained and may therefore be used in alternative applications.

Moreover it is herewith achieved that a locking means may be inserted through the first aperture through the joint members. The positive securing herewith provided is very reliable and strong. The strength is limited by the shear strength of the locking means inserted and the strength of the joint members.

This provides for locking of the articulated joint in the open position.

Furthermore an articulated joint for a walking aid is provided. The articulated joint according to the invention is due to its locking means reliable and safe to operate.

The device may be collapsed to a closed position during transportation for space saving purposes and extended to an open position for use. It is thereby possible to use the same device in various locations. The device is secure for the user to operate in at least the open position.

The joint members may be attached to the first or second leg by any appropriate attachment means, i.e. by means of welding, threaded fasteners, snap connection means, shrink-fit connection etc.

According to a further embodiment, the articulated joint according to the invention is peculiar in that, the first joint member has a second aperture, wherein the second aperture is radially offset from the shaft opening, wherein the second aperture and the first aperture of the second joint member are coaxially arranged in the closed position.

It is herewith achieved that a locking means may be inserted through the second aperture through the joint members. The positive securing herewith provided is very reliable and strong. The strength is limited by the shear strength of the locking means inserted and the strength of the joint members.

This provides for locking of the articulated joint in the closed position.

According to a further embodiment, the articulated joint according to the invention is peculiar in that, the locking means comprise a protrusion, for insertion through the first aperture of each joint member in at least the open position and/or insertion through the first aperture of the second joint member and the second aperture of the first joint member in the closed position.

This way of providing the locking means in combination with the first apertures and optionally the second aperture is highly reliable. It is possible to provide means of indicating correct and full insertion of the protrusion, by means of an indicator on the protrusion or by requiring a surface of the locking means to be flush with an external surface.

According to a further embodiment, the articulated joint according to the invention is peculiar in that, the clamping means comprise a lever, wherein the shaft is operably connected to the first joint member at one end and to the lever at the other end.

It is herewith achieved that the clamping forces may be achieved by appropriately selecting the length of the lever. As the lever may provide a lever arm to increase the clamping force applied in comparison to the force applied to operate the lever arm. The shaft provides means for transmitting the clamping force through the joint members.

According to a further embodiment, the articulated joint according to the invention is peculiar in that, the lever is provided with a cam.

It is herewith achieved that the clamping force applied may be designed by the shape of the cam. The cam also provides means for maintaining the locked position of the lever arm, because the cam my be designed such the lever arm at the end of its movement towards the locked position is biased towards the closed position, such that a force is required to pull the lever arm away from the locked position.

According to a further embodiment, the articulated joint according to the invention is peculiar in that, the protrusion is formed on the lever.

It is herewith achieved that the clamping means and locking means is operated simultaneously. When applying clamping force the locking means is automatically engaged and positively securing the joint members in the desired position. Furthermore it is impossible to clamp the joint members in an intermediate position that was not intended by the manufacturer, where the locking means are not engaged. The articulated joint is thereby preventing misuse.

According to a further embodiment, the articulated joint according to the invention is peculiar in that, the first joint member has at least one open position securing aperture, wherein said at least one open position securing aperture is radially offset from the shaft opening, wherein the locking means comprise at least one open position securing protrusion, and wherein said at least one open position securing aperture and said at least one open position securing protrusion are coaxially arranged in pairs in at least the open position, for insertion of said at least one open position securing protrusion at least partly through said at least one open position securing aperture in the open position.

By introducing the at least one open position securing aperture and the at least one open position securing protrusion positive securing of the joint member in the open position is achieved.

With more than one open position securing aperture and more than one open position securing protrusion, they will be arranged in pairs, such that one open position securing protrusion is inserted into one open position securing aperture.

The at least one open position securing aperture and the at least one open position securing protrusion are arranged in pairs.

This embodiment may be combined with an embodiment wherein each joint member has a first aperture, wherein the first aperture is radially offset from the shaft opening, wherein the first aperture of each joint member are coaxially arranged in at least the open position and wherein the locking means comprise a protrusion, for insertion through the first aperture of each joint member in at least the open position.

It is herewith achieved that added safety of the positive securing in the open position is provided. Furthermore the reliability is increased because a redundancy is introduced. According to a further embodiment, the articulated joint according to the invention is peculiar in that, the first joint member has a pair of open position securing apertures, wherein said pair of open position securing apertures are radially offset from the shaft opening, wherein the locking means comprise a pair of open position securing protrusions, and wherein said pair of open position securing apertures and said pair of open position securing protrusions are coaxially arranged in pairs in at least the open positions, for insertion in pairs of said pair of open position securing protrusions at least partly through said pair of open position securing apertures in the open position.

The joint members may be loaded symmetrically in the open position if the open position securing apertures and the open position securing protrusions are disposed symmetrically about the shaft opening.

According to a further embodiment, the articulated joint according to the invention is peculiar in that, said at least one open position securing protrusion is tapered towards its end.

It is herewith achieved that said at least one open position securing protrusion may easily be inserted into said at least one open position securing aperture.

In an embodiment said at least one open position securing protrusion is configured with a base cross-section having a maximum transverse dimension that exceeds the maximum transverse dimension of said at least one open position securing aperture.

Said at least one open position securing protrusion is prevented from penetrating fully through said at least one open position securing aperture.

For example said at least one open position securing protrusion may be conical.

It is herewith achieved that a bias may be applied between the first joint member an the second joint member by adjusting the length of said at least one open position securing protrusion.

This will eliminate play in the articulated joint in the open position.

According to a further embodiment, the articulated joint according to the invention is peculiar in that, the first joint member has at least one closed position securing aperture, wherein said at least one closed position securing aperture is radially offset from the shaft opening, wherein the locking means comprise at least one closed position securing protrusion, and wherein said at least one closed position securing aperture and said at least one closed position securing protrusion are coaxially arranged in pairs in at least the closed position, for insertion of said at least one closed position securing protrusion through said at least one closed position securing aperture in the closed position.

By introducing the at least one closed position securing aperture and the at least one closed position securing protrusion positive securing of the joint member in the closed position is achieved.

With more than one closed position securing aperture and more than one closed position securing protrusion, they will be arranged in pairs, such that one closed position securing protrusion is inserted into one closed position securing aperture.

This embodiment may be combined with an embodiment wherein the first joint member has a second aperture, wherein the second aperture is radially offset from the shaft opening, wherein the second aperture and the first aperture of the second joint member are coaxially arranged in the closed position and wherein the locking means comprise a protrusion, for insertion through the first aperture of the second joint member and the second aperture of the first joint member in the closed position.

It is herewith achieved that added safety of the positive securing in the closed position is provided. Furthermore the reliability is increased because a redundancy is introduced.

According to a further embodiment, the articulated joint according to the invention is peculiar in that, the first joint member has a pair of closed position securing apertures, wherein said pair of closed position securing apertures are radially offset from the shaft opening, wherein the locking means comprise a pair of closed position securing protrusions, and wherein said pair of closed position securing apertures and said pair of closed position securing protrusions are coaxially arranged in pairs in at least the closed positions, for insertion in pairs of said pair of closed position securing protrusions at least partly through said pair of closed position securing apertures in the closed position.

The joint members may be loaded symmetrically in the closed position if the closed position securing apertures and the closed position securing protrusions are disposed symmetrically about the shaft opening.

According to a further embodiment, the articulated joint according to the invention is peculiar in that, said at least one closed position securing protrusion is tapered towards its end.

It is herewith achieved that said at least one closed position securing protrusion may easily be inserted into said at least one closed position securing aperture.

In an embodiment said at least one closed position securing protrusion is configured with a base cross-section having a maximum transverse dimension that exceeds the maximum transverse dimension of said at least one closed position securing aperture.

Said at least one closed position securing protrusion is prevented from penetrating fully through said at least one closed position securing aperture.

For example said at least one closed position securing protrusion may be conical.

It is herewith achieved that a bias may be applied between the first joint member an the second joint member by adjusting the length of said at least one closed position securing protrusion.

This will eliminate play in the articulated joint in the closed position. In an embodiment of the articulated joint said at least one open position securing aperture, said at least one closed position securing aperture, said at least one open position securing protrusion and said at least one closed position securing protrusion are arranged such that said at least one open position securing protrusion and said at least one closed position securing protrusion can be combined in to at least one securing protrusion.

According to a further embodiment, the articulated joint according to the invention is peculiar in that, the joint further comprises a resilient member, wherein the resilient member is interposed between the abutment surfaces of the joint members.

It is herewith achieved that manufacturing tolerance may be taken up by the resilient member. The selection of manufacturing facility is thereby flexible.

Furthermore the resilient member may provide additional friction between the abutment surfaces of the joint members. It is thereby possible to achieve a more secure grip or to lower the forces necessary to apply to the abutment surfaces of the joint member by the clamping means to achieve a sufficient clamping.

The material for the resilient member may be selected among the following examples; rubber, synthetic rubber, polymers or foam materials. The resilient member can also be a sandwich made of one or more of the aforementioned materials.

According to a further embodiment, the device according to the invention is peculiar in that, the device comprises wheels, for moving the device across a surface.

It is herewith achieved that the person supported by the device becomes mobile and free to move about.

DESCRIPTION OF THE DRAWING

The invention will be explained in more detail below with reference to the accompanying drawing, where.

DETAILED DESCRIPTION OF THE INVENTION

In the explanation of the figures, identical or corresponding elements will be provided with the same designations in different figures. Therefore, no explanation of all details will be given in connection with each single figure/embodiment.

Figure 1:
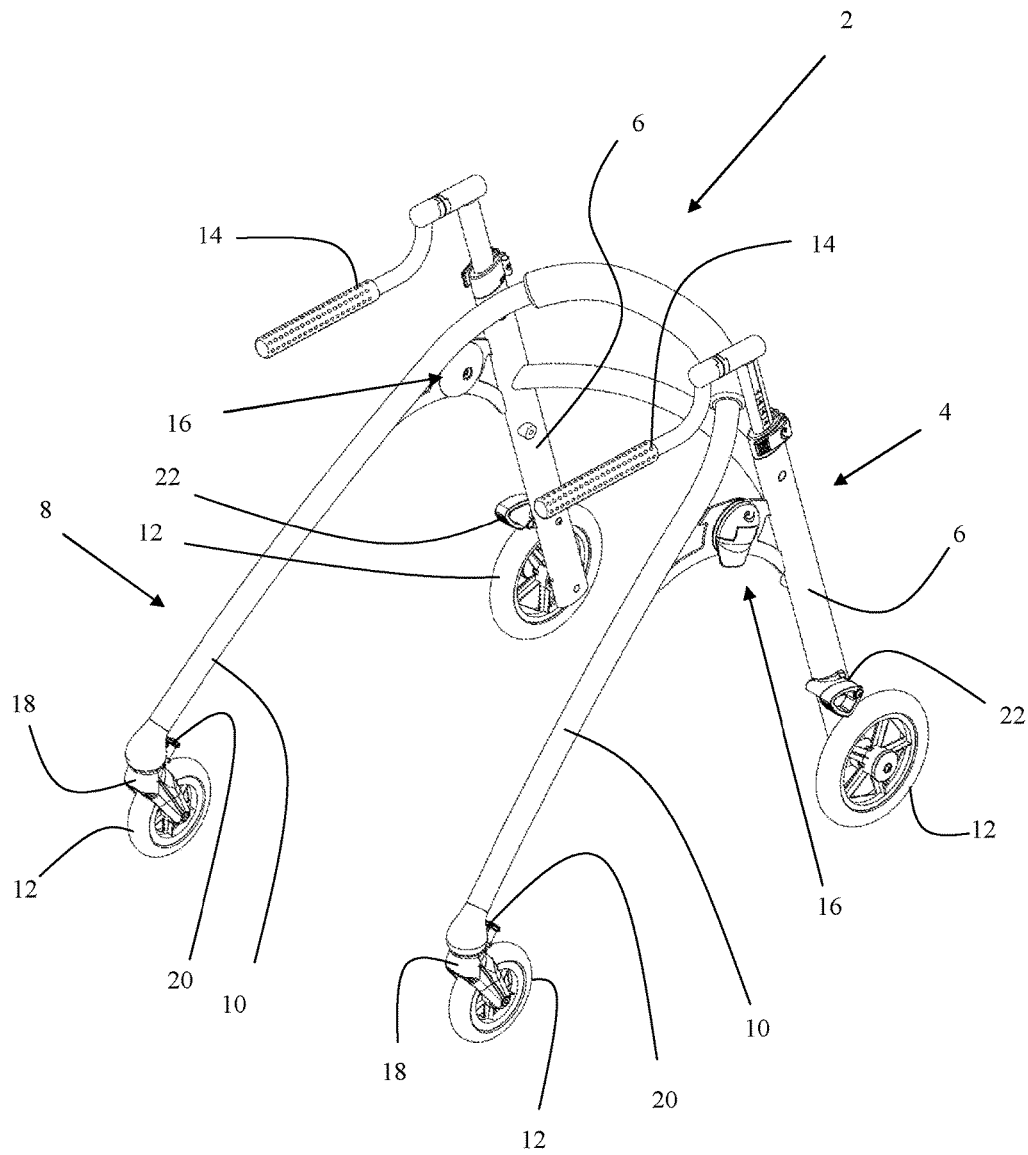
FIG. 1 shows an illustration of a device according to the invention in an open position.
Figure 2:
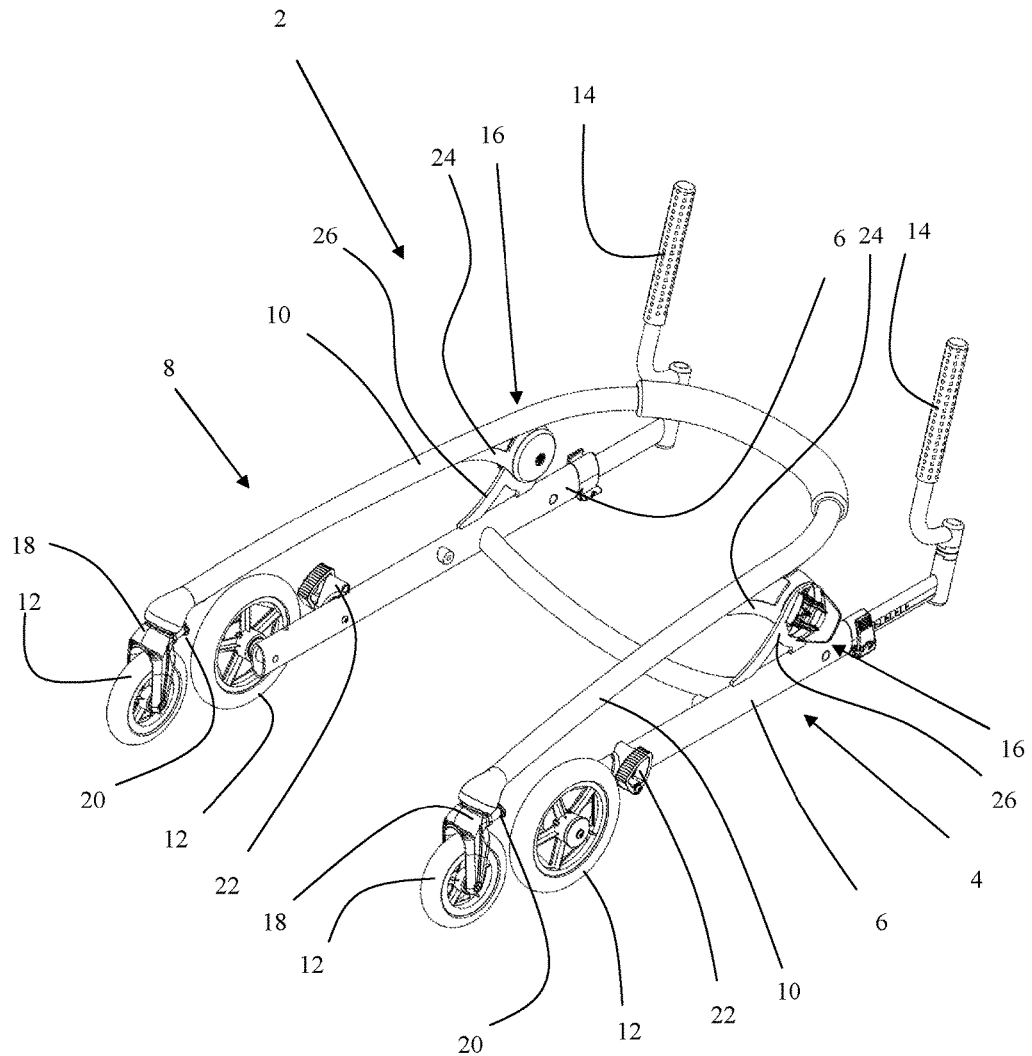
FIG. 2 shows an illustration of the device of FIG. 1 in a closed position.

FIG. 1 shows an illustration of a device 2 according to the invention in an open position and FIG. 2 shows an illustration of the device 2 of FIG. 1 in a closed position.

In the open position shown in FIG. 1 the device 2 is ready for use. In the closed position the device 2 is ready for transportation for example in the trunk of a car.

The device 2 shown in FIGS. 1 and 2 is a walking aid for disabled children.

The device 2 comprises a first leg frame 4 with two first legs 6 and a second leg frame 8 with two second legs 10.

The first leg frame 4 is shaped as an H. Each foot of the H-shaped first leg frame 4 is provided with wheels 12. The opposite end of the H-shaped first leg frame 4 is configured for receiving a grip 14 to support the user.

The second leg frame 8 is U-shaped. Each free end of the second legs 10 of the U-shaped second leg frame 8 is provided with a wheel 12.

The first and second leg frames 4, 8 are connected by two articulated joints 16, such that the first and second leg frames 4, 8 may pivot between an open and closed position. The articulated joint 16 comprises a first joint member 24 and a second joint member 26, which will be described further together with FIG. 3.

In the embodiment shown the articulated joints 16 are configured for attachment to the first and second leg frames 4, 8 by welding. Alternatively the articulated joint 16 may be configured for attachment by other fastening means, for example threaded fasteners, snap connecting means, shrink-fit connection, etc.

The front of the device 2 on FIG. 1 is defined by the wheels 12 of the second leg frame 8 and the rear is defined by the wheels of the first leg frame 4.

In the embodiment shown on FIGS. 1 and 2 the wheels 12 on the second leg frame is provided with castors 18 and comprise locking means 20 for locking the castors such that the device is restricted to movement along one direction.

In the embodiment shown on FIGS. 1 and 2 the first leg frame 4 comprise braking means 22 for restricting and/or preventing clockwise rotation of the wheels 12 on the first leg frame 4.

Figure 3:
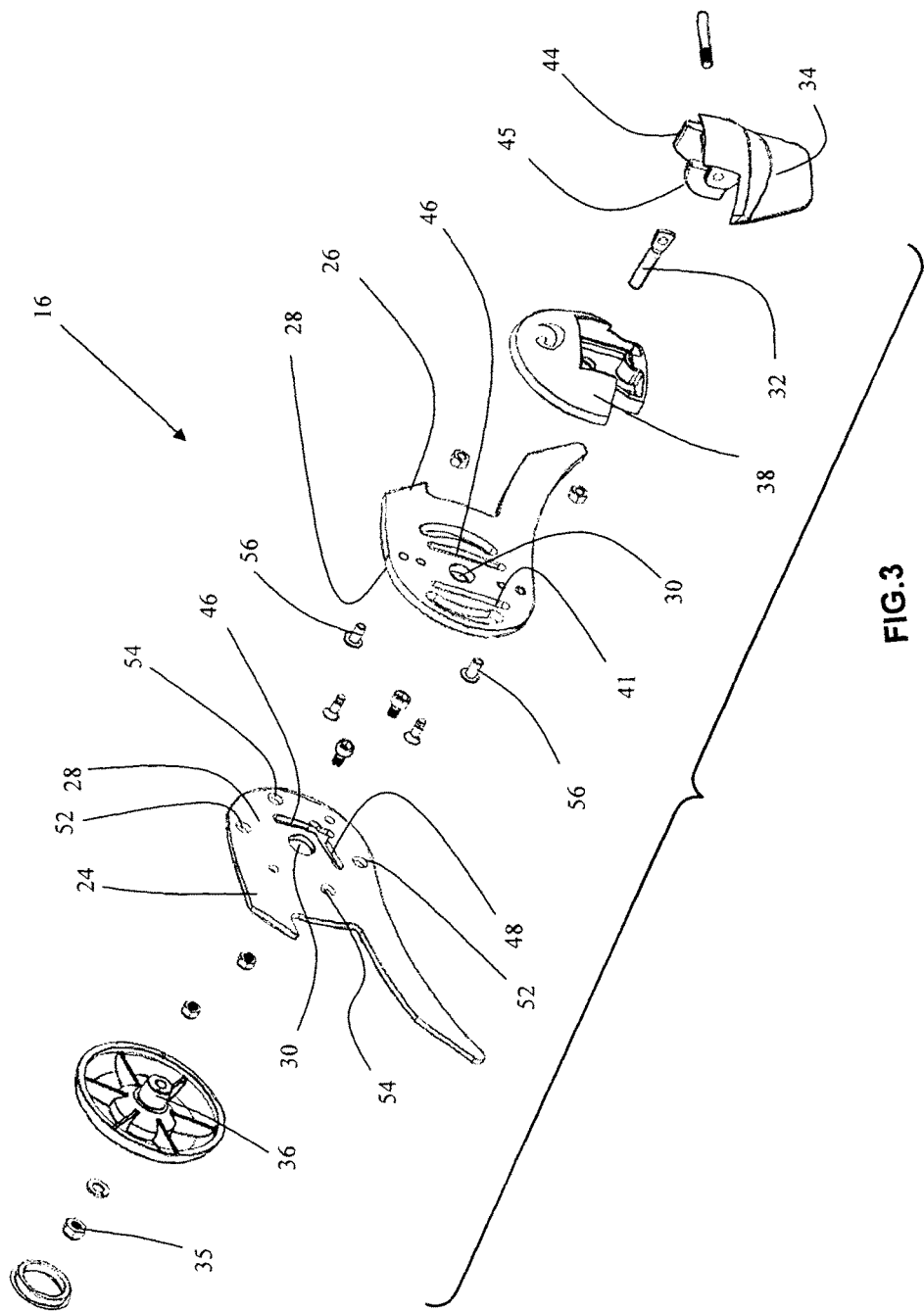
FIG. 3 shows an exploded view of an embodiment of an articulated joint according to the invention.

FIG. 3 shows an exploded view of an embodiment of the articulated joint 16.

The articulated joint 16, as mentioned before, comprises the first joint member 24 and the second joint member 26. Each joint member 24, 26 is configured for attachment to a leg on an object to be connected. The joint members 24, 26 have facing abutment surfaces 28. A shaft opening 30 is provided through the joint members 24, 26. The shaft openings 30 are coaxial such that a shaft 32 may be received through the shaft openings 30. The joint members 24, 26 are pivotable about the shaft 32.

A clamping means is provided, for releasably pressing the abutment surfaces 28 of the joint members 24, 26 toward each other.

In the embodiment shown in FIG. 3 the clamping means comprises a lever 34. The lever 34 connects to one end of the shaft 32 and the opposite end of the shaft 32 connects to a nut 35 that is in abutment with a bushing 36 located on the side of the first joint member 24 opposite to its abutment surface 28. A housing 38 is connected to the side of the second joint member 26 opposite its abutment surface 28. A pin 40 is inserted through an opening in the shaft 32 and the lever 34, such that the lever 34 may pivot about the pin 40 between a locked position and an unlocked position. The lever 34 is provided with a cam 42 (see FIG. 4a-c) that has an abutment surface on the housing 38. This will be described further in relation to FIG. 4a-c.

A locking means is provided, for releasable positive securing of the joint members 24, 26 in at least the open position of the legs.

In the embodiment shown in FIG. 3 the locking means comprise a protrusion 44. The first and second joint member 24, 26 each has a first aperture 46 and the first joint member 24 has a second aperture 48. The protrusion 44 is formed on the lever 34.

In the open position of the articulated joint and with the lever 34 in the locked position the protrusion 44 stretches through the first aperture 46 of each joint member 24, 26.

In the closed position of the articulated joint and with the lever 34 in the locked position the protrusion 44 stretches through the first aperture 46 of the second joint member 26 and the second aperture 48 of the first joint member 24.

In the articulated joint 16 of the embodiment in FIG. 3 the first joint member 24 has two open position securing apertures 52 that are radially offset from the shaft opening 30 and positioned symmetrically about the shaft opening 30.

In the articulated joint 16 of the embodiment in FIG. 3 the first joint member 24 has two closed position securing apertures 54 that are radially offset from the shaft opening 30 and positioned symmetrically about the shaft opening 30.

In the embodiment of FIG. 3 the locking means comprise two position securing protrusions 56 combining two open position securing protrusions and two closed position securing protrusions respectively into two elements in the form of screws.

In the embodiment shown in FIG. 3 the lever 34 is provided with an additional protrusion 45. The second joint member 26 has a slot 41 that allows the additional protrusion 45 to protrude through the second joint member 26, when the installed lever 34 is moved towards the locked position. This provides symmetry with the protrusion 44 and therefore added stability of the locking means.

An example of an object with legs to be connected may be a device 2 as shown in FIGS. 1 and 2.

Another example of such an object may be a chair (not shown) having two leg frames, each leg frame having two legs. The legs being connected by two articulated joints 16 according to the invention. The chair is collapsible due to the articulated joints 16.

Yet another example of such an object may be a seat (not shown) on a chair (not shown) or a device 2 according to FIGS. 1 and 2. Wherein the seat is connected to the chair or device 2 by a pair of articulated joints 16 according to the invention. In this way the seat may be collapsible. When the seat is in its un-collapsed position the seat is safely secured against collapsing by the articulated joint 16 according to the invention.

Figure 4A:
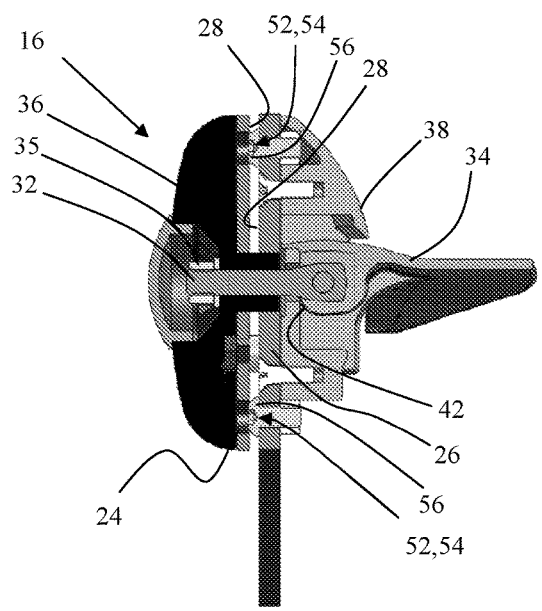
FIG. 4a-c shows a cross section of the articulated joint of FIG. 3 with the lever in an unlocked, an intermediate and a locked position respectively.
Figure 4B:
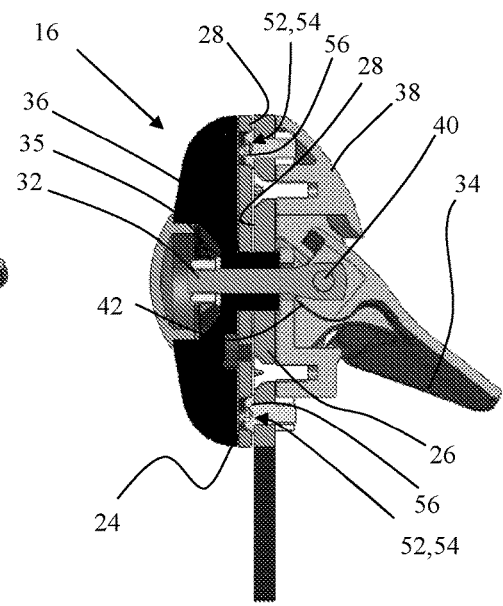
Figure 4C:
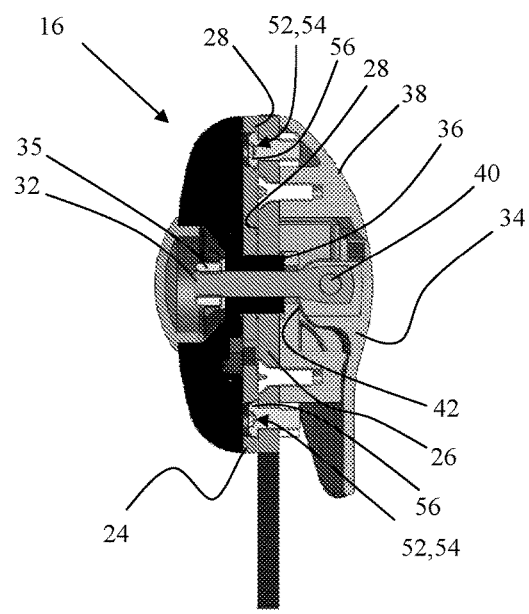

FIG. 4a-c shows a cross section of the articulated joint 16 of FIG. 3 with the lever 34 in an unlocked, an intermediate and a locked position respectively.

On FIG. 4a the lever 34 is in the unlocked position. The first joint member 24 and the second joint member 26 are not pressed towards each other and may even be distanced apart with a gap between them.

On FIG. 4b the lever 34 is shown in an intermediate position, while being moved towards its closed position. The cam 42 is in abutment with the housing 38 and is pulling the shaft 32 in a direction towards the right on FIG. 4b. Because of its restriction by the nut 35 and bushing 36 the first joint member 24 is moved towards the housing 38, such that the abutment surface 28 of the first joint member 24 is pressed towards the abutment surface 28 of the second joint member 26. Simultaneously the two position securing protrusions 56 starts to penetrate the two open position securing apertures 52 or the two open position securing apertures 54 according to the position of the articulated joint 16.

The two securing protrusions 56 are tapered towards their ends. The two securing protrusions 56 are configured with a base cross-section having a maximum transverse dimension that exceeds the maximum transverse dimension of the two open position securing apertures 52 or the two open position securing apertures 54, respectively. Therefore, in FIG. 4b, the two securing protrusions 56 are in contact with the edge of the two open position securing apertures 52 or the two open position securing apertures 54, respectively. The two securing protrusions 56 are prevented from penetrating further into the two open position securing apertures 52 or the two open position securing apertures 54, respectively.

Further turning of the lever 34 will cause the two securing protrusions 56 to build up a biasing force onto the first joint member 24.

On FIG. 4c the lever 34 is shown in the locked position. The cam 42 is still in abutment with the housing 38 and exerts a pressure between the first joint member 24 and the second joint member 26 via the pin 40, the shaft 32 the nut 35, bushing 36 and the two securing protrusions 56.

Figure 5A:
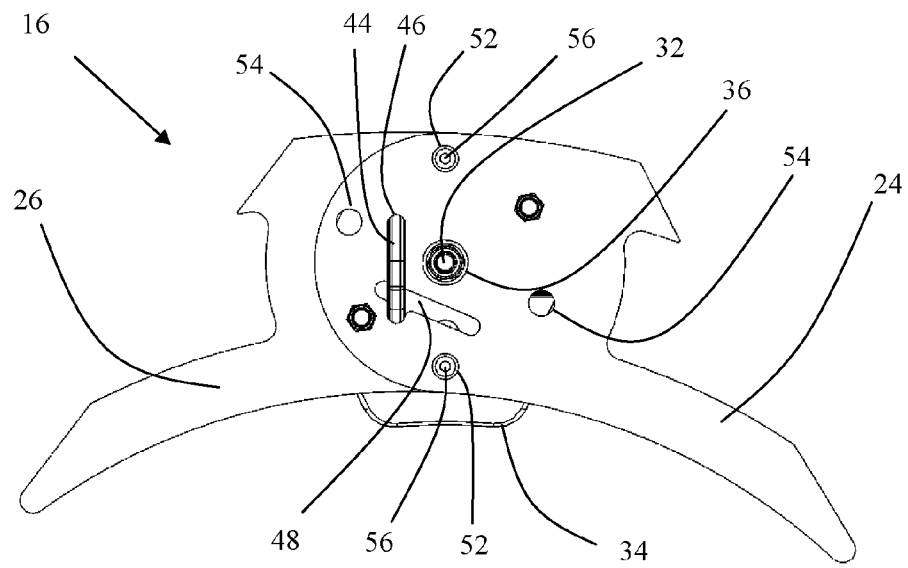
FIG. 5a-b shows a plan view of the articulated joint of FIG. 3, in an open and closed position respectively.
Figure 5B:
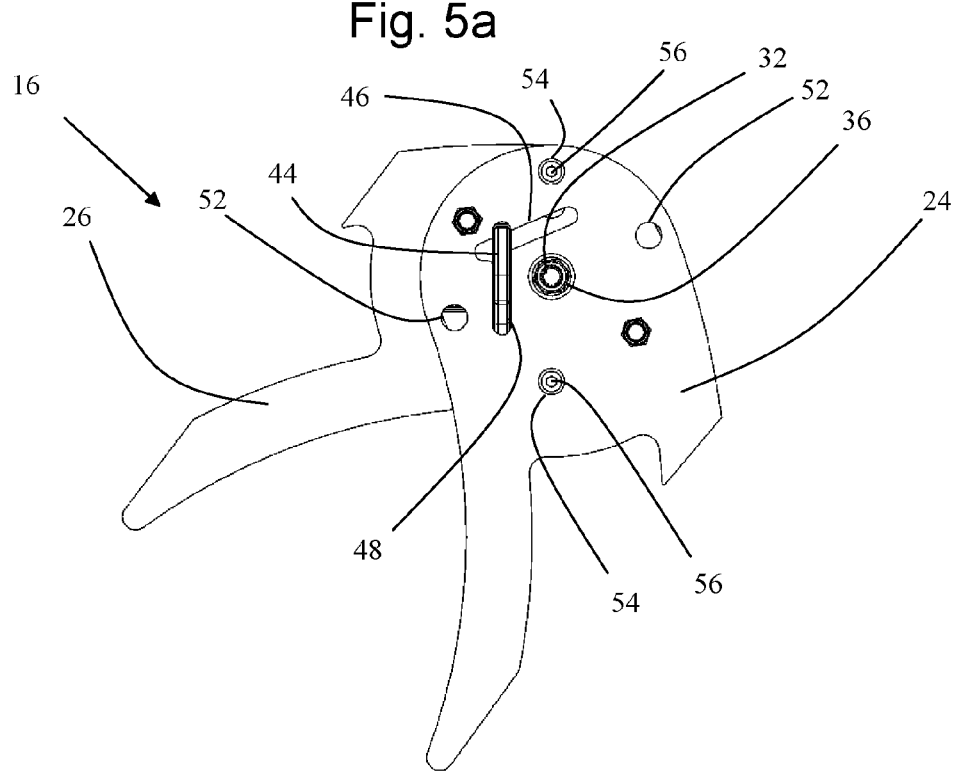

FIG. 5a-b shows a plan view of the articulated joint 16 of FIG. 3, in an open and closed position respectively.

In the open position on FIG. 5a the first apertures 46 of the first and second joint member 24, 26 are coaxially arranged. The protrusion 44 extends through the first apertures 46 and positively secures the joint members 24, 26 in the open position of the articulated joint 16. The two open position securing apertures 52 and the two securing protrusions 56 are aligned coaxially in pairs on FIG. 5a. Each securing protrusion 56 extends partly through one open position securing aperture 52 and assists in positively securing the joint members 24, 26 in the open position of the articulated joint 16.

The locked state is releasable by moving the lever 34 (see FIG. 4a-c) to an unlocked position whereby the protrusion 44 and the two securing protrusions 56 are withdrawn from the first apertures 46 and the two open position securing apertures 52, respectively.

In the closed position on FIG. 5b the first aperture 46 of the second joint member 26 and the second aperture 48 of the first joint member 24 are coaxially arranged. The protrusion extends through the first aperture 46 of the second joint member 26 and the second aperture 48 of the first joint member 24 and positively secures the joint members 24, 26 in the closed position of the articulated joint 16. The two closed position securing apertures 52 and the two securing protrusions 56 are aligned coaxially in pairs on FIG. 5b. Each securing protrusion 56 extends partly through one closed position securing aperture 52 and assists in positively securing the joint members 24, 26 in the closed position of the articulated joint 16.

The locked state is releasable by moving the lever 34 (see FIG. 4a-c) to an unlocked position whereby the protrusion 44 and the two securing protrusions 56 are withdrawn from the first apertures 46 and second apertures 48 and the two closed position securing apertures 52, respectively.

In alternative embodiments of the articulated joint 16 the first joint member 24 may have additional apertures (not shown), for releasable positive securing of the joint members 24, 26 in additional positions. The additional positions are intermediate positions between the open and closed position.

Figure 6:
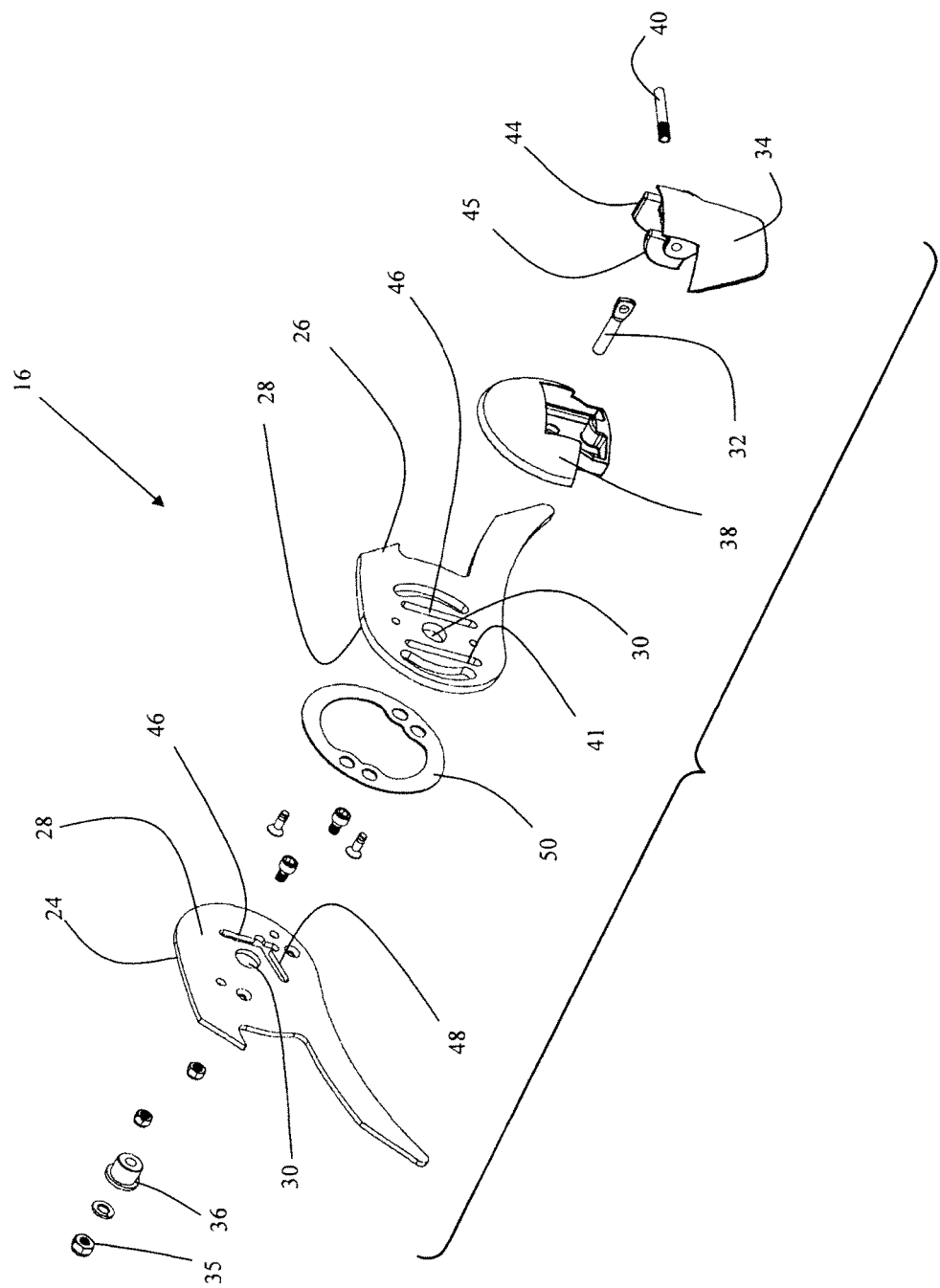
FIG. 6 shows an exploded view of an embodiment of an articulated joint according to the invention.

FIG. 6 shows an exploded view of an embodiment of the articulated joint 16.

The articulated joint 16, as mentioned before, comprises the first joint member 24 and the second joint member 26. Each joint member 24, 26 is configured for attachment to a leg on an object to be connected. The joint members 24, 26 have facing abutment surfaces 28. A shaft opening 30 is provided through the joint members 24, 26. The shaft openings 30 are coaxial such that a shaft 32 may be received through the shaft openings 30. The joint members 24, 26 are pivotable about the shaft 32.

A clamping means is provided, for releasably pressing the abutment surfaces 28 of the joint members 24, 26 toward each other.

In the embodiment shown in FIG. 6 the clamping means comprises a lever 34. The lever 34 connects to one end of the shaft 32 and the opposite end of the shaft 32 connects to a nut 35 that is in abutment with a bushing 36 located on the side of the first joint member 24 opposite to its abutment surface 28. A housing 38 is connected to the side of the second joint member 26 opposite its abutment surface 28. A pin 40 is inserted through an opening in the shaft 32 and the lever 34, such that the lever 34 may pivot about the pin 40 between a locked position and an unlocked position. The lever 34 is provided with a cam 42 (see FIG. 7a-c) that has an abutment surface on the housing 38. This will be described further in relation to FIG. 7a-c.

A locking means is provided, for releasable positive securing of the joint members 24, 26 in at least the open position of the legs.

In the embodiment shown in FIG. 6 the locking means comprise a protrusion 44. The first and second joint member 24, 26 each has a first aperture 46 and the first joint member 24 has a second aperture 48. The protrusion 44 is formed on the lever 34.

In the open position of the articulated joint and with the lever 34 in the locked position the protrusion 44 stretches through the first aperture 46 of each joint member 24, 26.

In the closed position of the articulated joint and with the lever 34 in the locked position the protrusion 44 stretches through the first aperture 46 of the second joint member 26 and the second aperture 48 of the first joint member 24.

The articulated joint 16 of the embodiment in FIG. 6 further comprises a resilient member 50. The resilient member 50 is interposed between the abutment surfaces 28 of the joint members 24, 26.

In the embodiment shown in FIG. 6 the lever 34 is provided with an additional protrusion 45. The second joint member 26 has a slot 41 that allows the additional protrusion 45 to protrude through the second joint member 26, when the installed lever 34 is moved towards the locked position. This provides symmetry with the protrusion 44 and therefore added stability of the locking means.

An example of an object with legs to be connected may be a device 2 as shown in FIGS. 1 and 2.

Another example of such an object may be a chair (not shown) having two leg frames, each leg frame having two legs. The legs being connected by two articulated joints 16 according to the invention. The chair is collapsible due to the articulated joints 16.

Yet another example of such an object may be a seat (not shown) on a chair (not shown) or a device 2 according to FIGS. 1 and 2. Wherein the seat is connected to the chair or device 2 by a pair of articulated joints 16 according to the invention. In this way the seat may be collapsible. When the seat is in its un-collapsed position the seat is safely secured against collapsing by the articulated joint 16 according to the invention.

Figure 7A:
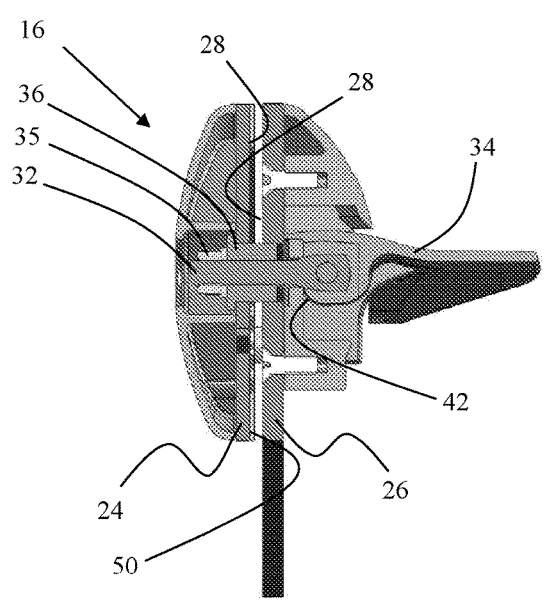
FIG. 7a-c shows a cross section of the articulated joint of FIG. 6 with the lever in an unlocked, an intermediate and a locked position respectively.
Figure 7B:
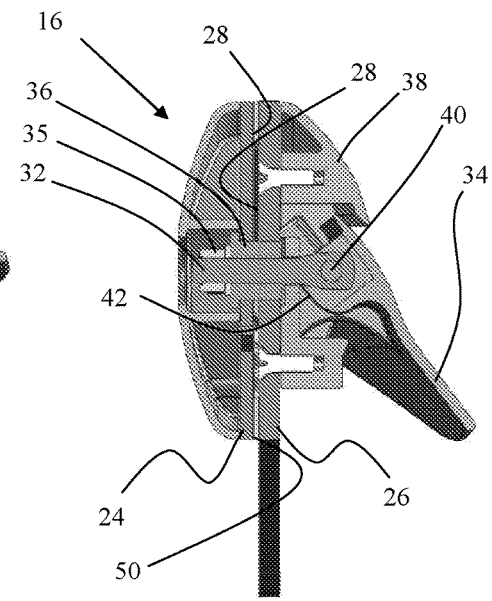
Figure 7C:
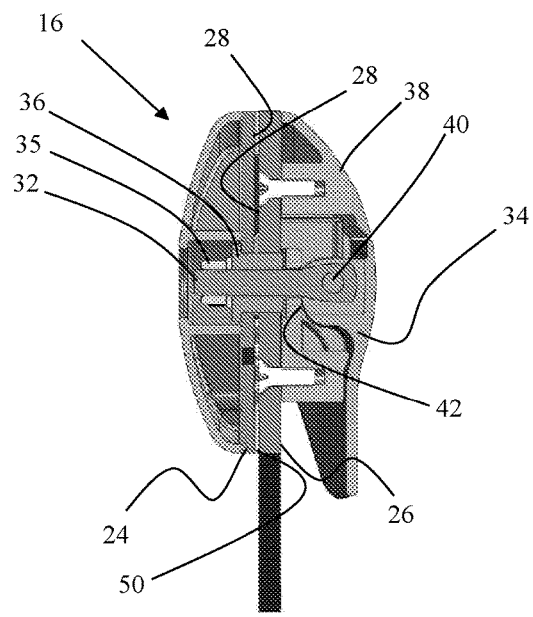
Figure 8A:
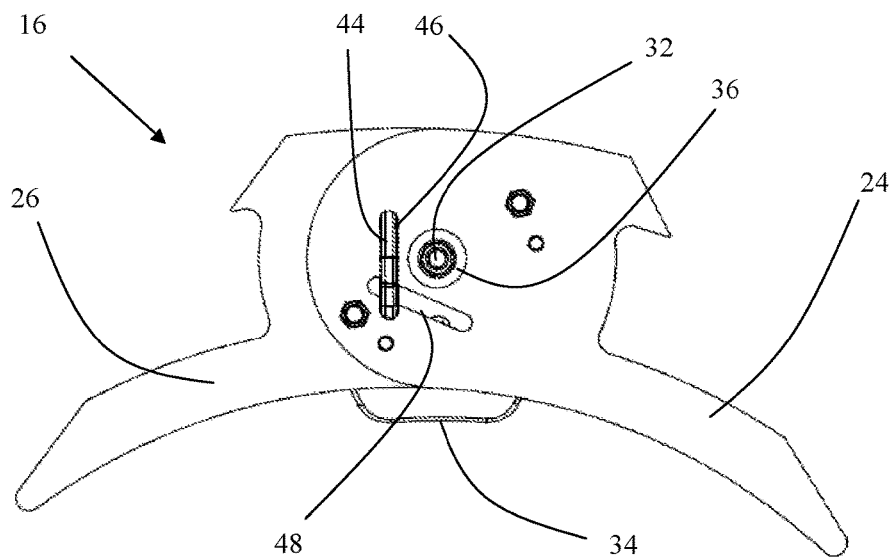
FIG. 8a-b shows a plan view of the articulated joint of FIG. 6, in an open and closed position respectively.
Figure 8B:
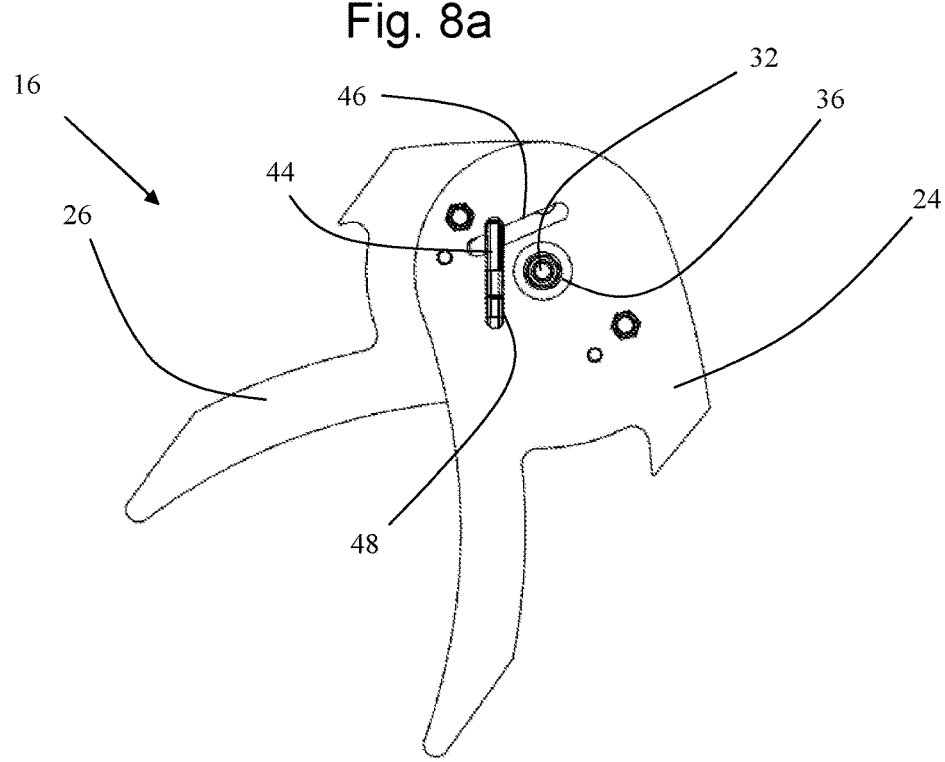

FIG. 7a-c shows a cross section of the articulated joint 16 of FIG. 6 with the lever 34 in an unlocked, an intermediate and a locked position respectively.

On FIG. 7a the lever 34 is in the unlocked position. The first joint member 24 and the second joint member 26 are not pressed towards each other and may even be distanced apart with a gap between them.

On FIG. 7b the lever 34 is shown in an intermediate position, while being moved towards its closed position. The cam 42 is in abutment with the housing 38 and is pulling the shaft 32 in a direction towards the right on FIG. 4b. Because of its restriction by the nut 35 and bushing 36 the first joint member 24 is moved towards the housing 38, such that the abutment surface 28 of the first joint member 24 is pressed towards the abutment surface 28 of the second joint member 26. The resilient member 50 that is interposed between the abutment surfaces 28 is being compressed and takes up any tolerances between the abutment surfaces 28.

On FIG. 4c the lever 34 is shown in the locked position. The cam 42 is still in abutment with the housing 38 and exerts a pressure between the first joint member 24 and the second joint member 26 via the pin 40, the shaft 32 the nut 35, bushing 36 and the resilient member 50.

FIG. 5a-b shows a plan view of the articulated joint 16 of FIG. 3, in an open and closed position respectively.

In the open position on FIG. 5a the first apertures 46 of the first and second joint member 24, 26 are coaxially arranged. The protrusion 44 extends through the first apertures 46 and positively secures the joint members 24, 26 in the open position of the articulated joint 16. The locked state is releasable by moving the lever 34 (see FIG. 4a-c) to an unlocked position whereby the protrusion 44 is withdrawn from the first apertures 46.

In the closed position on FIG. 5b the first aperture 46 of the second joint member 26 and the second aperture 48 of the first joint member 24 are coaxially arranged. The protrusion extends through the first aperture 46 of the second joint member 26 and the second aperture 48 of the first joint member 24 and positively secures the joint members in the closed position of the articulated joint 16. The locked state is releasable by moving the lever 34 (see FIG. 4a-c) to an unlocked position whereby the protrusion 44 is withdrawn from the first apertures 46 and second apertures 48.

In alternative embodiments of the articulated joint 16 the first joint member 24 may have additional apertures (not shown), for releasable positive securing of the joint members 24, 26 in additional positions. The additional positions are intermediate positions between the open and closed position.

The invention claimed is:

1. An articulated joint, for pivotably connecting a first leg to a second leg, the joint comprising;
    a first joint member, configured for attachment to the first leg,
    a second joint member, configured for attachment to the second leg,
    a shaft, wherein the joint members have facing abutment surfaces, wherein each of the joint members has a shaft opening, wherein the shaft is received through the shaft openings, for connecting the joint members, such that the legs may pivot between an open and a closed position,
    a clamping means, for releasably pressing the abutment surfaces of the joint members toward each other, and
    a locking means, for releasable positive securing of the joint members in at least the open position,
    wherein each joint member has a first aperture, wherein the first aperture is radially offset from the shaft opening, and wherein the first aperture of each joint member is coaxially arranged in at least the open position,
    wherein the clamping means comprise a lever,
    wherein the shaft is operably connected to the first joint member at one end and to the lever at another end, and
    wherein a protrusion is formed on the lever.

2. An articulated joint according to claim 1, wherein the first joint member has a second aperture, wherein the second aperture is radially offset from the shaft opening, and wherein the second aperture and the first aperture of the second joint member are coaxially arranged in the closed position.

3. An articulated joint according to claim 1, wherein the locking means comprise a protrusion, for insertion through the first aperture of each joint member in at least the open position and/or insertion through the first aperture of the second joint member and the second aperture of the first joint member in the closed position.

4. An articulated joint according to claim 1, wherein the lever is provided with a cam.

5. An articulated joint according to claim 1, wherein the joint further comprises a resilient member, wherein the resilient member is interposed between the abutment surfaces of the joint members.

6. An articulated joint, for pivotably connecting a first leg, the joint comprising:
    a first joint member, configured for attachment to the first leg,
    a second joint member, configured for attachment to the second leg,
    a shaft, wherein the joint members have facing abutment surfaces, wherein each of the joint members has a shaft opening, wherein the shaft is received through the shaft openings, for connecting the joint members, such that the les may pivot between an open and closed position,
    a clamping means, for releasably pressing the abutment surfaces of the joint members toward each other, and
    a locking means, for releasably positive securing of the joint members in at least the open position,
    wherein each joint member has a first aperture, wherein the first aperture is radially offset from the shaft opening, and wherein the first aperture of each joint member is coaxially arranged in at least the open position,
    wherein the first joint member has at least one open position securing aperture, wherein said at least one open position securing aperture is radially offset from the shaft opening, wherein the locking means comprise at least one open position securing protrusion, and wherein said at least one open position securing aperture and said at least one open position securing protrusion are coaxially arranged in pairs in at least the open position, for insertion of said at least one open position securing protrusion at least partly through said at least one open position securing aperture in the open position.

7. An articulated joint according to claim 6, wherein said at least one open position securing protrusion is tapered towards its end.

8. An articulated joint according to claim 7, wherein the closed position securing protrusion is tapered towards its end.

9. An articulated joint, for pivotably connecting a first leg to a second leg, the joint comprising:
    a first joint member, configured for attachment to the first leg,
    a second joint member, configured for attachment to the second leg,
    a shaft, wherein the joint members have facing abutment surfaces, wherein each of the joint members has a shaft opening, wherein the shaft is received through the shaft openings, for connecting the joint members, such that the legs may pivot between an open and a closed position,
    a clamping means, for releasably pressing the abutment surfaces of the joint members toward each other, and
    a locking means, for releasable positive securing of the joint members in at least the open position,
    wherein each joint member has a first aperture, wherein the first aperture is radially offset from the shaft opening, and wherein the first aperture of each joint member is coaxially arranged in at least the open position,
    wherein the first joint member has at least one closed position securing aperture, wherein said at least one closed position securing aperture is radially offset from the shaft opening, wherein the locking means comprise at least one closed position securing protrusion, and wherein said at least one closed position securing aperture and said at least one closed position securing protrusion are coaxially arranged in pairs in at least the closed position, for insertion of said at least one closed position securing protrusion through said at least one closed position securing aperture in the closed position.

10. A device, for supporting a person, the device comprising two articulated joints according to claim 1, a first leg frame having two first legs and a second leg frame having two second legs, wherein said two articulated joints are connected between the first and second leg frames, for pivoting of the leg frames between an open and a closed position, wherein said two articulated joints pivotably connect the first legs to the second legs, each articulated joint comprising:
- a first joint member configured for attachment to the first leg,
- a second joint member configured for attachment to the second leg,
- a shaft, wherein the joint members have facing abutment surfaces, wherein each of the joint members has a shaft opening, wherein the shaft is received through the shaft openings, for connecting the joint members, such that the legs may pivot between an open and a closed position,
- a clamping means, for releasably pressing the abutment surfaces of the joint members toward each other, and
- a locking means, for releasable positive securing of the joint members in at least the open position,
- wherein each joint member has a first aperture, wherein the first aperture is radially offset from the shaft opening, and wherein the first aperture of each joint member is coaxially arranged in at least the open position,
- wherein the clamping means comprise a lever,
- wherein the shaft is operably connected to the first joint member at one end and to the lever at another end, and
- wherein a protrusion is formed on the lever.

11. A device according to claim 10, wherein the device comprises wheels, for moving the device across a surface.

\* \* \* \* \*